Figure 1:
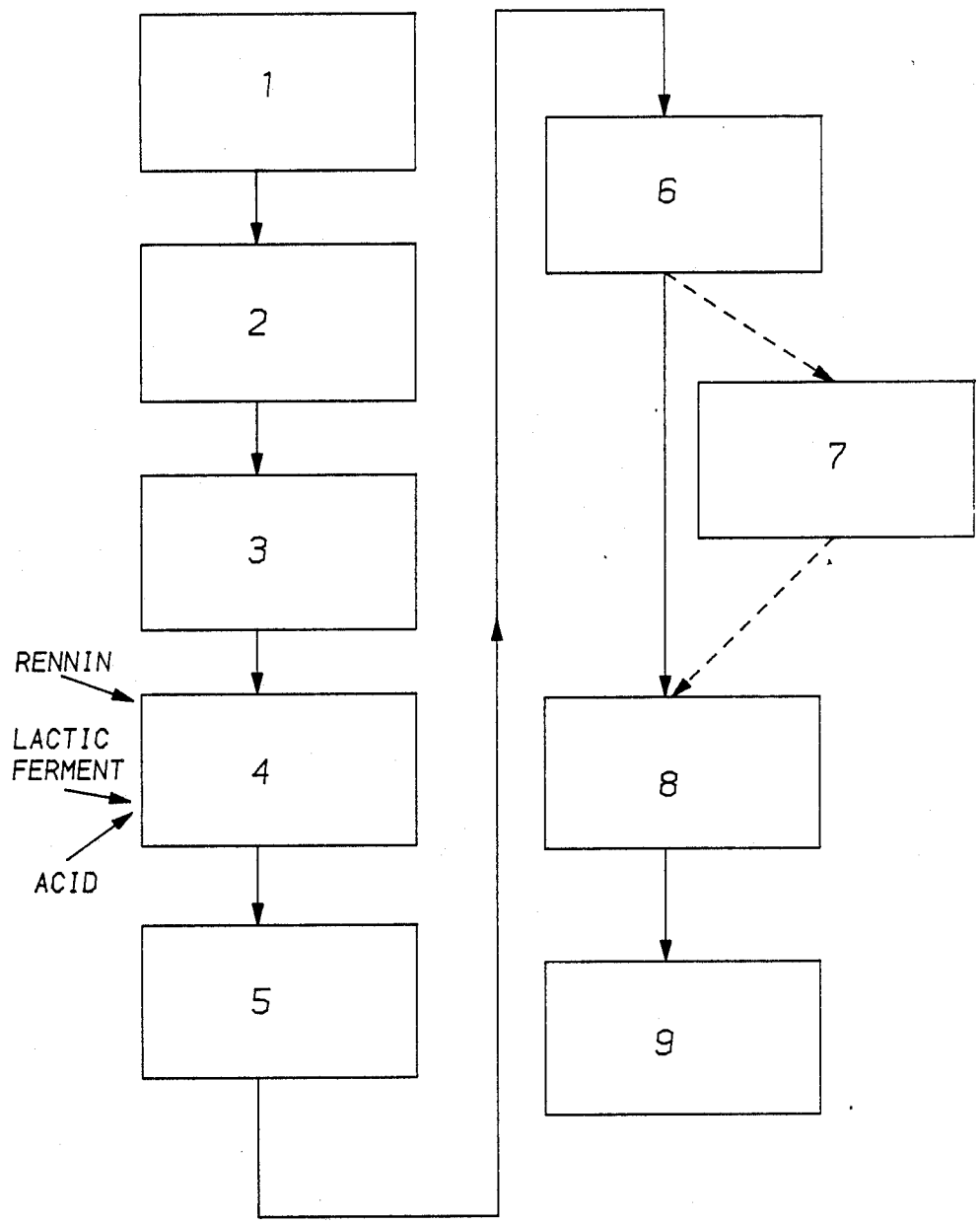

United States Patent [19]

Dieu et al.

[11] Patent Number: 4,897,277

[45] Date of Patent: Jan. 30, 1990

[54] METHOD FOR PRODUCING CHEESE BY MEANS OF MICROFILTRATION

[75] Inventors: Bernard Dieu; Jean Cuq, both of Sebazac; Blas Tarodo de la Fuente; Michel Bennasar, both of Assas; Jean-Marc Desroches, Les Costes Rouges, all of France

[73] Assignee: Valmont S.A., Montauban, France

[21] Appl. No.: 246,662

[22] PCT Filed: Dec. 11, 1987

[86] PCT No.: PCT/FR87/00496

§ 371 Date: Aug. 10, 1988

§ 102(e) Date: Aug. 10, 1988

[87] PCT Pub. No.: WO88/04141

PCT Pub. Date: Jun. 16, 1988

[30] Foreign Application Priority Data

Dec. 12, 1986 [FR] France ................................ 86 17464

[51] Int. Cl.$^4$ .............................................. A23C 19/05
[52] U.S. Cl. ...................................... 426/491; 426/495
[58] Field of Search ................ 426/491, 495; 210/651, 210/195.2

[56] References Cited

U.S. PATENT DOCUMENTS 4,341,801  7/1982  Weissman ........................... 426/491
4,751,003  6/1988  Raehse et al. ....................... 210/651

*Primary Examiner*—George Yeung
*Attorney, Agent, or Firm*—Harness, Dickey & Pierce

[57] ABSTRACT

The object of the present invention is the treatment of a curd (5) obtained from milk (1) which had been subjected to a pretreatment aimed at coagulating the milk casein and precipitating the whey protein through a microfiltration loop (30) comprising at least one cartridge (34) with ceramic tubes (36), so as to separate the cheese from the whey.

The device comprises a means for a sequential unclogging under high pressure (39, 43, 44) by reverse permeation for a short period of time without interrupting the continuous microfiltration. Advantages: increased useful life, no clogging, cleaning and sterilization with all the acid and alkaline products used in a dairy plant, insensitiveness to pH, preservation of the quality of the product, low pressure drop across the membrane, high yield.

9 Claims, 2 Drawing Sheets

METHOD FOR PRODUCING CHEESE BY MEANS OF MICROFILTRATION

The object of the present invention is the production of a cheese from milk which is subjected to a special filtration.

The production of a cheese is carried out through a number of essential steps well known in the cheese industry. The first step consists in treating the milk to obtain a lactic curd. In the following description and in the claims, one should understand by "milk" all milks of animal or vegetable origin with or without previous pretreatment. Hereinafter "milk" may also be referred to as "raw milk" which includes homogenized and precipitated milks and/or milks wherein the curd has been precipitated from the whey and other water soluble constituents/materials of the milk.

The curd obtained is then subjected to a separation step called draining aimed at separating the precipitated asides which form a coagulum entrapping both the globules of fat and the whey proteins which had precipitated, the mixture being called "cheese", from constituent water with unprecipitated soluble products, in particular products containing soluble nitrogen, lactose, inorganic salts, this mixture being called "whey". This step, which consists in a separation by gravity within the product divided into units of a small volume, is long and expensive and cannot be compatible with the present day food processing industry.

Improvement of this type of production was sought through the use of centrifuges of standard but limited performance.

French Patent No. 2 232 999 proposes an ultra filtration process on an organic semipermeable membrane enabling the recovery of the totality of the proteins by passing a standard coagulum through this organic membrane. Such a process has numerous drawbacks, starting with the organic membranes themselves, as used for carrying the process into effect, because they remain sensitive to physical parameters such as the pressure and the temperature during the course of the process, and also to chemical parameters such as the pH of certain strong acids or alkalis used when cleaning and/or sterilizing. Further, ultrafiltration is a technique which has limitations with regard to a product such as curd, because the organic membranes have an opening or pore diameter which ensures the retention of the totality of the proteins, therefore of the unprecipitated proteins, thus leading to a rapid clogging of the filters, which phenomenon is amplified by the polarization at the level of the organic membrane itself. Further, it is impossible to proceed to the unclogging during the continuous operation of ultrafiltration. Therefore, these periodical uncloggings imply stopping the installation and a full cleaning cycle.

The object of the present invention is to propose a manufacturing process for a cheese and an associated device for carrying the process into effect, the main characteristic of which is that the milk is subjected to a step where the proteins precipitate and the casein coagulates for obtaining a curd, the curd being thereafter subjected to at least one continuous mechanical separation by microfiltration through ceramic walls, this microfiltration step comprising sequential uncloggings without interruption of the microfiltration so as to maintain a very low pressure drop across the membrane.

The sequential unclogging of the process is carried out by reverse permeation under high pressure in a very short time.

Also, in order to limit the pressure drop across the membrane, the permeate outlet is restricted so as to create a back pressure.

This process is further characterized in that the curd is subjected to a thermal treatment prior to the microfiltration, so as to obtain an additional precipitation of the whey proteins.

The process according to the invention is carried out by circulating the product under conditions of laminar flow through the ceramic tubes of the microfiltration cartridge. According to this continuous process, a speed in the range from 1 to 10 meters per second and, preferably from 3 to 5 meters per second, is provided. The microfiltration is carried out stepwise, so as to take also into account the increase in viscosity.

The process is carried out under controlled constant pressure and temperature, which implies the provision of cooling zones for the purpose of taking into account the temperature increase of the product during its circulation.

The device enabling to carry into effect the process is comprised of at least one microfiltration loop comprising a ceramic cartridge fed with the product by a circulating means, a first permeate outlet connected to a storage tank, a branch circuit for a portion of the permeate towards a storage tank under high pressure, a second permeate outlet connected to said storage tank under high pressure, an outlet for the filtration residue. This microfiltration loop is series mounted on the main feed line.

The device further comprises a shut-off valve on the first permeate outlet, and a means for restricting the flow upstream of the branch circuit, a shut-off valve between the second permeate outlet and the storage tank under high pressure. A means for controlling the circulating flow is placed upstream of the downstream flow restricting system and downstream of the upstream shut-off valve. The device is further provided with a pressure control means in the loop, this pressure control means being capable of acting on the restricting means.

The storage tank under high pressure is fed with the permeate through the branch circuit on which is disposed a high pressure pump.

The storage tank is of the two-fluid type, one of which is compressible, for example nitrogen.

The storage tank can also be of the single-fluid type connected to a high pressure source with a relief valve, this high pressure source being if desired, an auxiliary nitrogen container.

The device according to the invention comprises several microfiltration loops branching from a main line.

This device is unclogged sequentially by reverse permeation under high pressure by opening the shut-off valve disposed on the second permeate outlet loop by loop with preliminary sequential isolation by closing the shut-off valve disposed upstream of the restricting means.

The tubes in the ultrafiltration cartridges mounted as a bank are made of ceramic of the α aluminum type with an average pore diameter in the range from 0.2 μm to 5 μm.

Such a process offers the advantage of remaining applicable to numerous types of productions, because the permeate flow, the residence time in the device, the qualities of the end product can be controlled very accurately. The end product exhibits a fine regular homogeneous structure, due to the low pressure drop across the membrane and to the fact that the flow is laminar and does not affect the molecules themselves.

The process can operate without interruption and the useful life of the device is increased by the use of a ceramic. The device can be cleaned with a 2% sodium hydroxide and a nitric acid solution, thus obviating the need for using specific products for each type of membrane as it is the case when using organic membranes. Further, the reverse permeation under high pressure causes a negligible dilution of the filtration residue because the duration of the permeation is extremely short, which improves the yield of the installation. This process using this type of unclogging requires only very little room because the flow per unit of surface is high, which is primarily due to the highly hydrophobic character of the ceramic and to the high porosity of the membranes.

Figure 2:
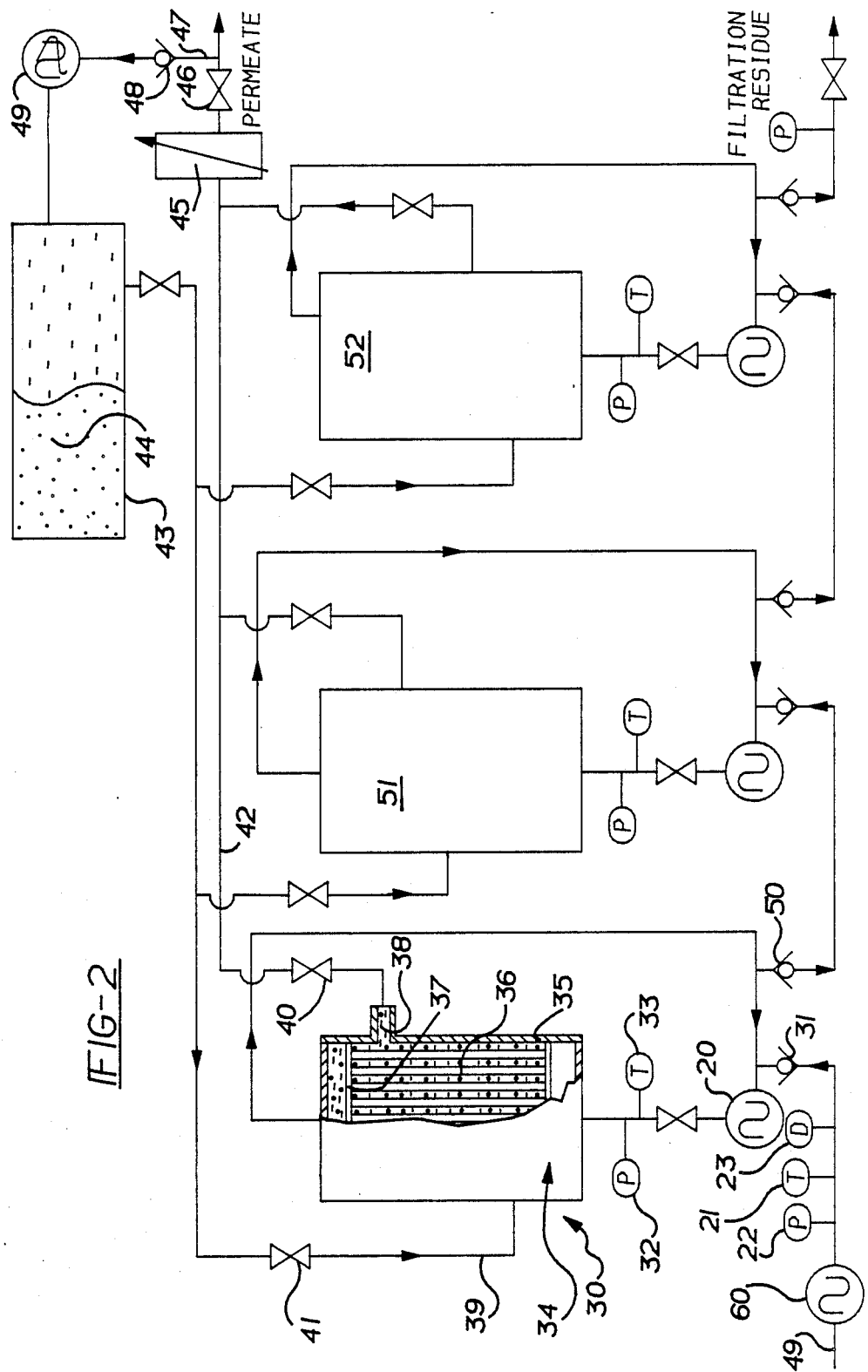

Now, we shall proceed to the description of the process and of the device by means of a particular embodiment of the invention not intended to limit the scope thereof, wherein reference is made to FIGS. 1 and 2 which show:

FIG. 1: a block diagram of the process according to the invention,

FIG. 2: i a detailed view of the microfiltration device of the invention.

The process according to the invention uses milk 1 which is homogenized in a homogenizer device 2 under double pressure and decompression. Such a homogenizer prevents the fat from rising and the occurrence of two phases. The pasteurization of step 3 is carried out continuously by rising the temperature to within the range from 85° to 95° C. during 2 to 5 minutes. The effect of this pasteurization is to precipitate the whey proteins which are normally solubilized. The pasteurized milk is cooled at 4 to a temperature within the range from 20° to 45° C., and, more particularly, from 24 to 28° C., this temperature corresponding to the coagulation temperature.

Adjuvants are added to promote the coagulation of the milk caseins. Rennin and/or lactic ferments can be used in a known manner, but also chemical flocculation, in particular, through the use of acidification. The product obtained called lactic curd has a strongly acidic pH, beneath 4.6.

The coagulum obtained after the necessary reaction time, which depends on the type of curd desired, is subjected to a de-curding step through mixing 5 which yields a homogeneous thick "paste", this homogeneity being perfected by a pumping 6 using a centrifugal pump.

This thick paste can be treated directly by microfiltration 8 or be subjected to an additional thermal treatment 7 for the purpose of improving the precipitation of the whey proteins, because these solubilized proteins would not be retained during the microfiltration.

This thermal treatment consists in heating to a temperature in the range from 55° to 85° C. for a period of time which can vary from 0 to 5 minutes. The curd is cooled immediately thereafter, and the product obtained has a firmer consistency and a stronger hydrophobic character.

The microfiltration 8 separates the cheese from the whey, the device being detailed hereafter with reference to FIG. 2. The cheese then contains the totality of the fat and the major part of the protein nitrogenous matter, as well as a proportion of the soluble substances which remain bound to the proteins and also a certain amount of water.

The whey or permeate contains no fat but contains a small percentage of soluble proteinic nitrogenous matter which had not precipitated (1 g/l), lactose, inorganic salts, and water.

The whey or permeate is thereafter transferred to be used in a well known manner, as a by-product.

As to the cheese, various subsequent treatments 9 are applied in view of its consumption and they depend on the type of product which needs to be produced. Such subsequent treatments include aromatization, addition of various elements such as salt, sugar, spices, figurative elements, etc . . . , homogenization, smoothing, thermal treatment, ripening and finally, packaging.

The microfiltration device of FIG. 2 comprises a main circuit 19 fed with the mixed curd obtained in step 5 of the process and pumped in step 6 of the same process. The feed pump 60 is followed by a series of temperature 21, pressure 22, and flow rate 23 sensors. On this main circuit, there is series mounted a first microfiltration loop 30. A valve 31 prevents any return of the product to the main line. A recirculation pump 20 sucks the raw mixed curd and delivers it to a microfiltration means after control of the pressure 32, the temperature 33.

The microfiltration means consists of at least one cartridge 34 comprising a metal jacket 35, generally made of stainless steel so as to withstand the various mechanical and chemical aggressions, inside which jacket there is disposed a bank of ceramic—alumine α of a controlled porosity—tubes 36, the ends of which are bound to plates 37 so that the product flows in the tubes and the permeation occurs from the inside of the tube outside. Such cartridges are commercially available under the trade name MEMBRALOX. The metal jacket is connected at both ends to the recirculation circuit, but two permeate outlets 38, 39 having shut-off valves 40, 1 are also provided. The first outlet 38 is connected to the permeate collector 42 and the second outlet 39 is connected to a storage tank 43 of the accumulator type, i. e. having a portion of its volume filled with a compressible fluid 44.

A restricting means in the form of a progressive valve 46 is disposed on the permeate collector so as to create, when it is closed, a back pressure in the permeate circuit connected to the first outlet.

Upstream of this restricting means, a flowmeter 45 completes the permeate evacuation line. A branch circuit 7 provided with a nonreturn valve 48 feeds the high pressure pump 49 which in turn feeds the permeate storage tank maintained under pressure by the compressible fluid.

The filtration residue flowing out from the cartridge 34 is directed to the recirculation pump upstream of which there is provided a branch circuit with a nonreturn valve 50 connected to the main circuit and the outflow of which corresponds to the inflow arriving to the loop less the flow of permeate. One passage can be continued in the same manner through several successive loops 51, 52 comprised of the same components as loop 30 described in detail immediately above.

This microfiltration device is provided with all the auxiliary equipment well-known in the construction of systems, such as isolation valves for allowing maintenance, collars, flanges, joints and other reducers, this equipment not coming within the scope of the invention, nor does the control of the installation by means of a computer or of a programmable automation.

However, the example which has just been described is only an exemplary embodiment capable of variations by means known to those skilled in the art, which are, accordingly, considered as included in the present invention. For example, in order to keep the temperature of the product constant while heating occurs through circulation, a cooling device can be provided on each microfiltration loop.

Also, the unclogging sequences, the pressure in the storage tank, the opening time of the valves controlling the counter-current inflow of permeate under high pressure or the restriction on the permeate line are selected according to the product. The same holds true when it comes to finding the best compromise possible between the highest temperature which does not affect adversely the product and the minimal temperature yielding this same product with the lowest viscosity possible.

An example of a product obtained according to the process using the specific device which has just been described can now be given. 1000 grams of milk having the following composition

|  | Grams |
| --- | --- |
| Fat | 63.35 |
| Nitrogenous proteinic matter | 29.40 |
| De-fatted dry matter | 53.03 |
| Water | 854.23 |
| yielded: | |
| 300 grams of cheese | |
| Dry matter | 103.50 g, of which |
| Fat | 63.00 g |
| Nitrogeneous matter | 28.40 g |
| Water | 196.50 g |
| 700 grams of whey | |
| Dry matter | 42.00 g, of which |
| Nitrogeneous matter | 2.10 g |
| Water | 658.00 g |

The present invention is not limited by the exemplary embodiments described hereabove, but is on the contrary, capable of modifications and variations which will become apparent to those skilled in the art.

We claim:

1. A process for producing cheese from milk, comprising the steps of:
   (a) homogenizing raw milk;
   (b) treating said raw milk to obtain a coagulum containing precipitated whey protein, curd and whey;
   (c) transporting said coagulum through at least one microfiltration loop wherein said curd and said whey protein is separated from said whey; and
   (d) removing said curd and whey protein from said microfiltration loop for further processing as cheese.

2. The process according to claim 1 wherein said microfiltration loop further includes a porous membrane.

3. The process according to claim 2 wherein said porous membrane s pores are from about 0.2 micrometers to about 0.5 micrometers in diameter.

4. The process according to claim 2 further including the step of sequential unclogging of said porous membrane using high pressure reverse permeation.

5. The process according to claim 1 further including the pasteurization of said raw milk.

6. The process according to claim 1 further including the step of heating of said curd between about 55° C. and about 85° C. before step (c).

7. The process according to claim 6 further including the step of cooling said curd after said heating step and before step (c).

8. The process according to claim 1 wherein said microfiltration loop further includes at least one tubular ceramic porous membrane for providing laminar flow in said microfiltration loop.

9. The process according to claim 8 wherein the flow rate in said microfiltration loop is from about 3 meters to about 5 meters per second.

* * * * *